(12) United States Patent
Ress, Jr.

(10) Patent No.: US 7,384,075 B2
(45) Date of Patent: Jun. 10, 2008

(54) THREADED JOINT FOR GAS TURBINE COMPONENTS

(75) Inventor: Robert Anthony Ress, Jr., Carmel, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 10/845,860

(22) Filed: May 14, 2004

(65) Prior Publication Data

US 2005/0253379 A1 Nov. 17, 2005

(51) Int. Cl.
*F16L 25/00* (2006.01)
(52) U.S. Cl. ................... 285/333; 285/399
(58) Field of Classification Search ........... 285/390, 285/399, 401, 402, 333
See application file for complete search history.

(56) References Cited

U.S. PATENT DOCUMENTS

| | | | |
|---|---|---|---|
| 2,680,634 A * | 6/1954 | Haworth et al. ............. 464/162 |
| 2,681,837 A * | 6/1954 | Boyd et al. .................. 384/466 |
| 2,927,806 A * | 3/1960 | Lahee ......................... 285/115 |
| 3,602,535 A * | 8/1971 | Behning et al. .............. 403/118 |
| 4,361,296 A | 11/1982 | Hall et al. |
| 4,498,291 A * | 2/1985 | Jeffery ....................... 60/39.091 |
| 5,145,276 A | 9/1992 | Demange |
| 5,220,784 A | 6/1993 | Wilcox |
| 5,263,312 A | 11/1993 | Walker et al. |
| 5,581,999 A | 12/1996 | Johnson |
| 5,737,913 A | 4/1998 | Terry |
| 6,120,067 A * | 9/2000 | Mosing et al. .............. 285/333 |
| 6,478,344 B2 * | 11/2002 | Pallini et al. ................ 285/333 |
| 6,485,061 B1 * | 11/2002 | Mosing et al. ................ 285/93 |
| 6,494,499 B1 * | 12/2002 | Galle et al. ................. 285/334 |
| 6,511,285 B2 * | 1/2003 | Dodd .......................... 415/147 |
| 6,581,980 B1 * | 6/2003 | DeLange et al. ........... 285/334 |
| 6,990,719 B2 * | 1/2006 | Olivier ........................ 29/456 |
| 7,014,223 B2 * | 3/2006 | Della Pina et al. ......... 285/333 |
| 2002/0105187 A1 * | 8/2002 | Taylor ......................... 285/333 |
| 2004/0135370 A1 * | 7/2004 | Evans et al. ................ 285/333 |
| 2004/0155465 A1 * | 8/2004 | Noel et al. .................. 285/334 |
| 2004/0262919 A1 * | 12/2004 | Dutilleul et al. ............ 285/333 |

\* cited by examiner

*Primary Examiner*—Aaron M Dunwoody
(74) *Attorney, Agent, or Firm*—Krieg DeVault LLP; Matthew D. Fair, Esq.

(57) ABSTRACT

An assembly including inner and outer overlapping annular elements with interengaging threads. An axial abutment between the two elements is spaced from the threaded section to permit a structural and fluid seal at the joint. Pilot joints are provided to stabilize the joint and provide additional sealing.

18 Claims, 4 Drawing Sheets

THREADED JOINT FOR GAS TURBINE COMPONENTS

BACKGROUND OF THE INVENTION

The present application relates generally to disconnectable threaded joints for interconnecting two components. More particularly, one form of the present application relates to a threaded joint for coupling together gas turbine engine casings. Although the present application was developed for application in gas turbine engines, certain applications may exist in other fields.

Gas turbine engines usually include a number of cylindrical components joined together to define a housing. Within the housing, there is generally a flow of working fluid. Gas turbine engine designers have strived to secure the components of the housing in a way that maintains structural and pressure integrity while at the same time facilitating assembly and disassembly for inspection and/or repair of components.

A conventional system for connecting cylindrical gas turbine engine housing components has been to incorporate circumferential and abutting flanges which are secured to one another by clamps or fasteners extending through aligned openings in the abutting flanges. One limitation of this approach has been that the prior system complexity adds to the cost and potential unreliability of the joint. Further, the flanged, bolted joint and/or clamped joint may lead to an increase in the overall envelope for the engine.

Accordingly, there is a continuing need for an effective disconnectable joint for gas turbine engine components.

SUMMARY OF THE INVENTION

One form of the present invention contemplates an apparatus comprising: a first gas turbine engine component having a first annular portion with an internal thread and a first annular abutment surface spaced from the internal thread; and a second gas turbine engine component having a second annular portion with an external thread and a second annular abutment surface spaced from the external thread and abutting the first annular abutment surface, the first and second components at least partially overlapping one another and the threads interengage to couple the components together and place the abutting abutment surfaces in a first sealing relationship, wherein one of the components is in tension and the other of said components is in compression between the abutting abutment surfaces and the interengaging threads.

Another form of the present invention contemplates a method of assembling a threaded joint between two gas turbine components. The method comprising: orienting a cylindrical portion of the two components in an overlapping relationship, one of the components in the overlapping relationship defining an inner overlapping section having an externally threaded portion and the other component defining an outer overlapping section having an internally threaded portion; creating a differential thermal loading between the inner overlapping section and the outer overlapping section, the outer overlapping section having a greater thermal loading; threading the components together to bring an abutment surface on each of the components into an abutting relationship and establish a seal therebetween that is spaced from the threaded portions; and allowing the components to achieve equal thermal loading thereby increasing the axial preload.

Yet another form of the present invention contemplates an apparatus comprising: a first component having a first cylindrical portion with an internal thread and a first annular abutment surface spaced from the internal thread, the first component including a pair of first pilot surfaces spaced apart from the internal thread; and, a second component having a second annular portion with an external thread and a second annular abutment surface spaced from the external thread and abutting the first annular abutment surface, the first and second components at least partially overlapping one another and the threads interengage to couple the components together and place the abutting abutment surfaces in a first sealing relationship, wherein one of the components is in tension and the other of the components is in compression between the abutting abutment surfaces and the interengaging threads, and further wherein the second component including a pair of second pilot surfaces spaced apart from the external thread and in registry with the pair of first pilot surfaces to form a second sealing relationship.

One object of the present invention is to provide a unique threaded joint for gas turbine components.

Related objects and advantages of the present invention will be apparent from the following description.

DESCRIPTION OF THE PREFERRED EMBODIMENTS

Figure 1:
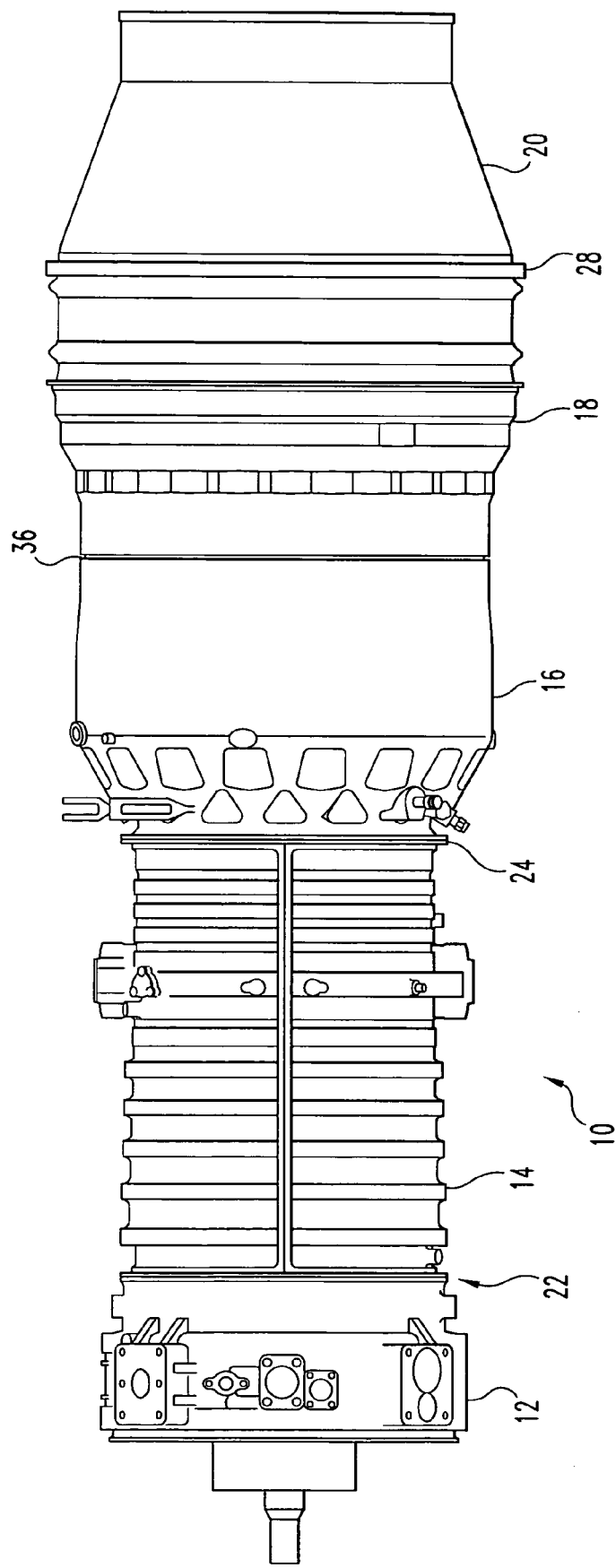
FIG. 1 shows an external side view of a gas turbine engine employing a prior art technique for joining annular components.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, there is illustrated a gas turbine engine 10 utilizing one embodiment of a threaded joint 36 of the present invention. The gas turbine engine 10 illustrated is purely illustrative and no limitation is intended herein to any specific type of gas turbine engine. The illustrative gas turbine engine comprises an accessory drive/inlet housing 12, compressor housing 14, diffuser/combustor housing 16, turbine housing 18 and exhaust housing 20. The general operation of gas turbine engines is well known to those of ordinary skill in the art and thus it is unnecessary to describe the operation of compression, combustion and expansion to extract work out of the gas turbine engine by a power turbine providing a rotary output or pure reaction to produce thrust. Gas turbine engines operate with internal pressures at the hundreds of PSI level. In at least one form, discharge pressures can approach 600 PSI on high pressure ratio applications having overall pressure ratios of about 40:1. The capability to withstand high pressures require joints between the various housings to be structurally sound, capable of a pressure seal, and removable for maintenance. The present application is applicable to a wide variety of pressures and is not limited, unless expressed to the contrary, to any particular pressure ranges.

Figure 2:
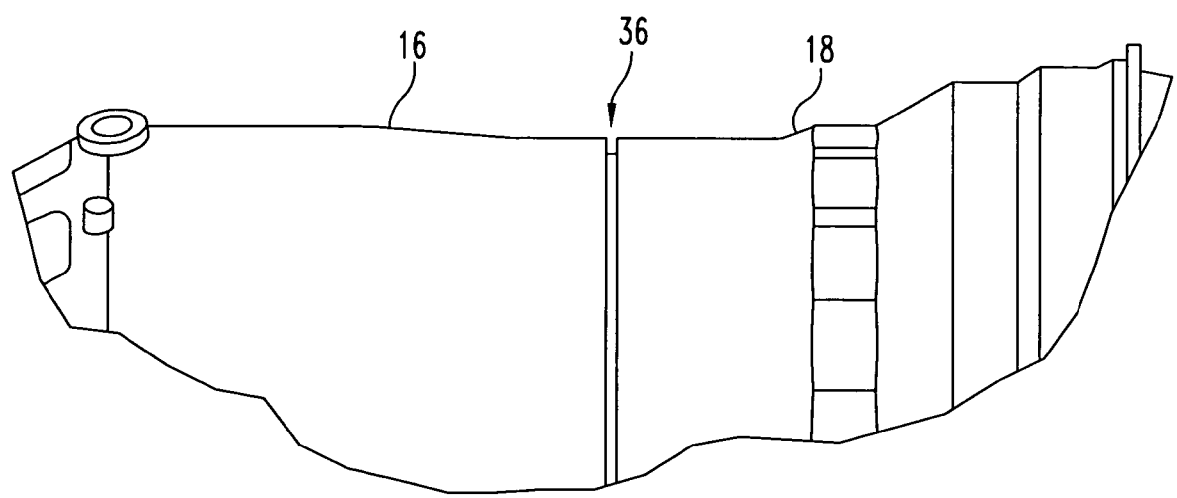
FIG. 2 is a fragmentary view of a gas turbine engine, comprising one embodiment of a threaded joint of the present invention.

With reference to FIG. 2, there is illustrated an enlarged fragmentary view of a portion of the gas turbine engine showing the joint 36 coupling the diffuser/combustor housing 16 to the turbine housing 18. While the joint of the present invention is illustrated between the diffuser/combustor housing 16 and the turbine housing 18, it is applicable to all joints in the gas turbine engine. Further, the present invention is contemplated for other fields, including but not limited to, rocket motors, steam turbines, liquid carrying tubes/pipes, and gaseous fluid carrying tubes/pipes.

Figure 3:
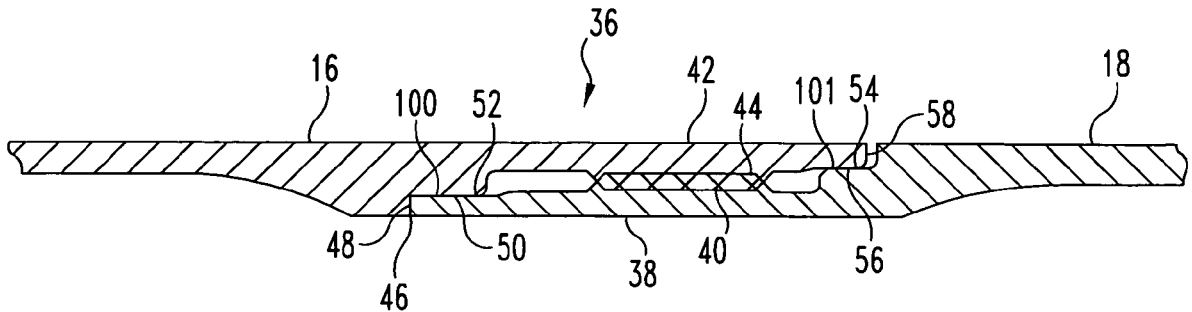
FIG. 3 is a fragmentary cross-section view of the threaded joint of FIG. 2.

With reference to FIG. 3, there is illustrated an enlarged fragmentary cross-sectional view of the joint 36. Housing 18 has an annular portion 38 with an externally threaded portion 40 formed thereon. Housing 16 has an annular portion 42 with an internally threaded portion 44 formed thereon. The portions 42 and 38 overlap, and the threads 40 and 44 interengage when in an assembled state. An end face 48 on annular portion 38 abuts a corresponding shoulder 46 on annular portion 42. In one embodiment, the interface between shoulder 46 and end face 48 is axially spaced from the interengaging threads 40 and 44 so that when the threads are tightened there is sufficient axial force to drive the end face 48 and shoulder 46 into an abutting relationship and form a seal. The term "seal" or "sealing" as utilized herein describes the reduction of fluid flow between the components coupled together at the joint. The reduction in fluid flow at the joint may be a complete prevention of fluid leakage between the components or a partial prevention of fluid leakage that minimizes fluid leakage between the components at the joint. The interengaging of the threaded joint places at least a portion of the outer annular portion 42 in tension and the inner annular portion 38 in compression.

Radial pilots 100 and 101 are formed on either side of the interengaging threaded joint. The radial pilot 100 comprises an inwardly facing pilot surface 50 formed on annular portion 42 and a corresponding outer facing pilot surface 52 formed on annular portion 38. Radial pilot 101 comprises an outer facing pilot surface 54 formed on annular portion 38 and an inner facing pilot surface 56 formed on annular portion 42. In one form the respective surfaces of the pilot surfaces are substantially parallel.

The parameters of the pilot joints, length to the axial abutting surfaces, and thread size are all selected to facilitate assembly/disassembly during a condition where the housings 16 and 18 are subjected to differential thermal conditions. In one non-limiting example the present invention contemplates a ten inch diameter threaded joint where the length from the thread element to the mutually abutting axial surfaces 48 and 46 is about 1½ inches. The thickness of annular portion 42 which is in tension and of annular portion 38 which is in compression is about 0.1 inches. In obtaining about a 0.002 inch deformation in each annular portion, a preload of about 125,000 pounds is generated. A 40,000 PSI bearing stress is generated at the abutting surfaces 48 and 46. A buttress thread is utilized at the threaded joint. This 125,000 pound load is sufficient to provide a fluid tight coupling with adequate bending stiffness. However, other joint sizes, threads, amount of deformation and preloads are contemplated herein.

In the assembly/disassembly phase, the housing 16 is subjected to a higher localized thermal loading than housing 18. This can be done by heating the exterior of housing 16 in the proximity of the annular portion 42 or by cooling the annular portion 38 of housing 18. Preferably, the heating of the housing occurs between the radial pilots 100 and 101. In this condition, the length from the threaded joint to the mutually abutting axial surfaces 48 and 46 is greater for annular portion 42 than it is for annular portion 38; the pilot surfaces 50 and 56 are greater in diameter than the interconnecting surfaces 52 and 54, and; threads 44 have clearance relative to threads 40. The heating provides clearance between the components forming the radial pilot 100 and 101.

The two components are threaded together in the state of differential thermal loading until the surfaces 48 and 46 abut one another. The threads are tightened to create a predetermined loading on these axial end faces. In one form of the invention, the preload is 125000 pounds. As the annular portions 38 and 42 reach equal thermal loading, annular portion 42 reduces in length and diameter relative to annular portion 38. The result of the cooling of the assembly is to create an axial preload between shoulder 46 and end face 48 and a radial preload between the surfaces 54 and 56 of radial pilot 101 and surfaces 50 and 52 of pilot 100. The practical effect is to tighten the joint and enhance the seals at the joint between the following pairs of surfaces: 50 and 52, 46 and 48, 54 and 56. To disassemble the joint, the differential thermal loading described above is employed and the annular portions 38 and 42 are unthreaded.

During operation of the gas turbine engine, the working fluid flow path is at least partially adjacent the annular portion 38 so that it is subjected to a higher thermal loading than annular portion 42. As a consequence, there is thermal growth in annular portion 38 relative to annular portion 42, thus increasing both the axial and pilot seals. It should be noted that the axial spacing of the pilot joints 50, 52 and 54-56 from the threads 40, 44 provide increased bending stiffness through the joint. In another embodiment, a secondary seal including, but not limited to, an E-seal, W-seal or C-seal can be employed in the void formed between the aft face 58 of housing 16 and the shoulder on housing 18.

Figure 4:
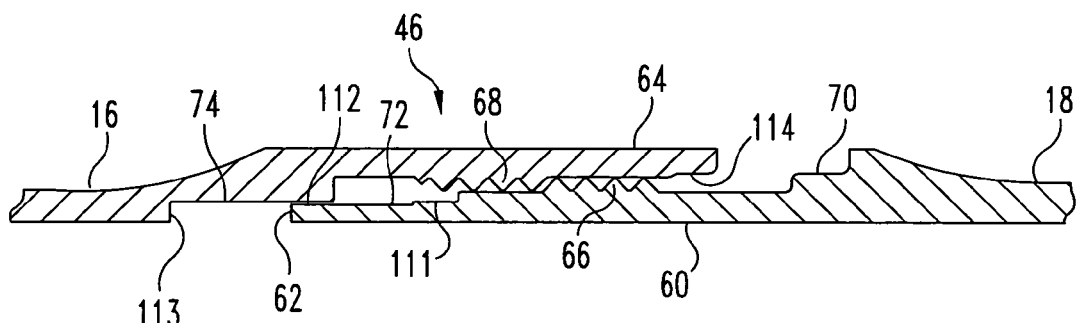
FIG. 4 is a fragmentary, cross section view of an alternative embodiment of the present invention showing the component joint at the beginning of assembly.
Figure 5:
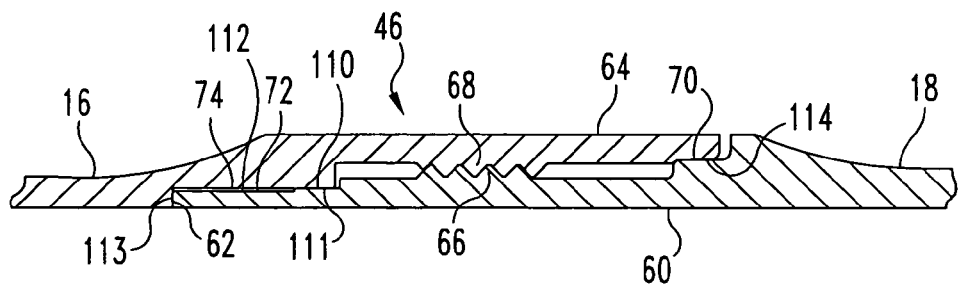
FIG. 5 is a fragmentary cross-section view of the joint of FIG. 4 shown in its assembled position.

The joint 46 shown in FIGS. 4 and 5 is substantially similar to the joint 36, but includes an enhanced self-piloting element. The utilization of like feature numbers is done to represent like features. Annular portion 60 extends from gas turbine housing 18 and has an axial end face 62. Annular portion 64 is integral with housing 16 and overlaps annular portion 60. An externally threaded section 66 on annular portion 60 interengages with an internally threaded section 68 on annular portion 64 as the components are threaded together. Lead-in pilot surface 72 on annular portion 60 cooperates with a corresponding pilot 74 on annular portion 64 leading from shoulder 113. This lead-in pilot surface 72 aids in threading the joint into place in the position shown in FIG. 5. As the components are assembled, the radial pilot 110 is formed by the engagement of surface 111 of portion 60 with surface 112 of portion 64. The lead-in pilot surface 72 on portion 60 does not normally contact the surfaces 74 and/or 112. However, the lead-in pilot surface 74 is located in close proximity to the component 64 in order to provide an alignment guide for the structure. Surface 72 can be set to engage surface 112 and/or 74 prior to threads 66 and 68 engaging to prevent cross-threading at assembly. Surface 62 disposed at the end of portion 60 is brought into an abutting relationship with surface 113 when the components are assembled. The seal is formed between surfaces 62 and 113, surfaces 111 and 112, and between surfaces 70 and 114. It should be noted that the same techniques for differentially thermally loading the joints can be employed for the joint illustrated in FIGS. 4 and 5.

Figure 6:
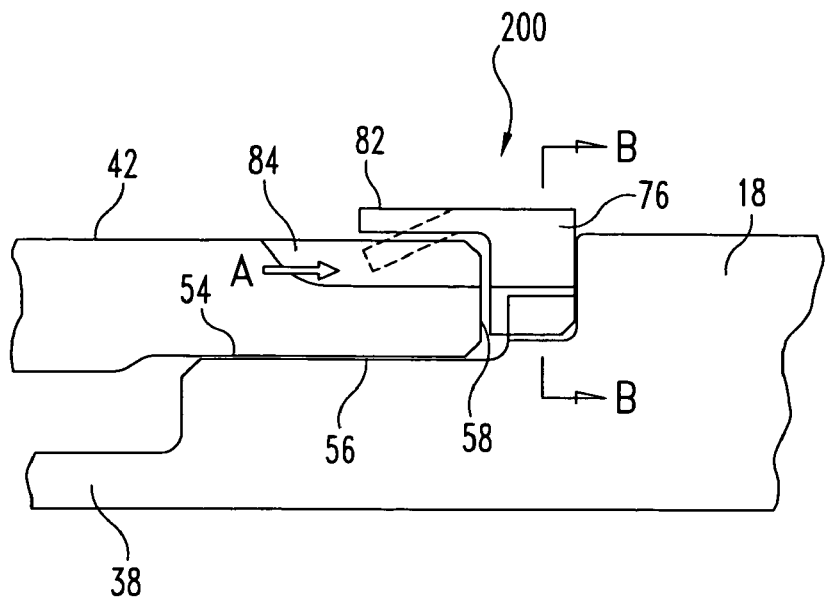
FIG. 6 is a fragmentary cross-section view showing a locking mechanism for the threaded joint of FIG. 3.
Figure 7:
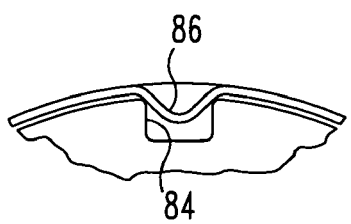
FIG. 7 is an illustrative end view taken at arrow A in FIG. 6.
Figure 8:
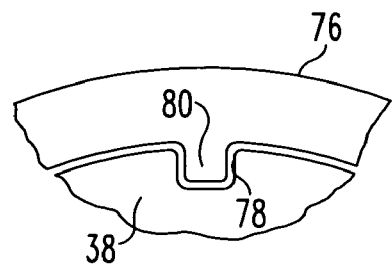
FIG. 8 is a cross-section view taken on line B-B of FIG. 6.

FIGS. 6, 7 and 8 illustrate an anti-rotation locking mechanism generally indicated at 200 which is illustrated here applied to the joint of FIGS. 2 and 3. It should be noted, however, that the anti-rotation mechanism may be employed with equal benefit to the other joints including, but not limited to, those set forth in FIGS. 4 and 5. The anti-rotation device comprises a ring 76 extending over both of annular end portions 42 and 38. As shown in FIG. 8, end portion 38 has a plurality of slots 78 (only one of which is shown) spaced around the circumference of annular section 38. A corresponding number of projections 80 extend from ring 76 into slots formed in portion 38. Ring 76 includes an annular section 82 which overlaps annular portion 42, including at least a portion of the slots 84 spaced around the circumference of the portion 42. When the elements are in their secure position and the projections 80 are lined up in grooves 78, the thin annular section 82 is deformed at 86 to extend into grooves 84. Thus, the elements are locked against rotation. Disassembly may take place after sections 86 are bent to clear grooves 84 and permit unthreading of the elements. The present application contemplates other anti-rotation locking mechanisms, such as, but not limited to, local welding for expendable applications, locking pins and lockwire.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
   a portion of a gas turbine engine including
   a first gas turbine engine component having a first annular portion with an internal thread and a first annular abutment surface spaced from said internal thread; and
   a second gas turbine engine component having a second annular portion with an external thread and a second annular abutment surface spaced from said external thread and abutting said first annular abutment surface, said first and second components at least partially overlapping one another and said threads interengage to couple said components together and place the abutting abutment surfaces in a first sealing relationship, wherein one of said components is in tension and the other of said components is in compression between said abutting abutment surfaces and said interengaging threads.

2. The apparatus as claimed in claim 1 wherein at least one pilot joint is formed between said components and spaced from said threads, said pilot including a first sealing surface on said component and a second sealing surface on said second component, and wherein said first and second sealing surfaces are disposed in an interference fit to form a second sealing relationship.

3. The apparatus as claimed in claim 2 wherein said at least one pilot joint defines a pair of spaced pilot joints, each of said pair of spaced pilot joints including said second sealing relationship between said components.

4. The apparatus as claimed in claim 3 wherein one of said pilot joints is adjacent said first sealing relationship and the other of said pilot joints is remote from said one pilot joint on the opposite end of said threads.

5. The apparatus as claimed in claim 1 wherein said second component is placed in compression against said first annular abutment surface and is exposed to higher thermal loading during operation than said first component thereby causing an increase in the axial preloading of said abutting surfaces during operation.

6. The apparatus as claimed in claim 2, which further includes a lead-in pilot to facilitate alignment of said components before interengagement of said threads.

7. The apparatus as claimed in claim 1 further comprising an engageable lock means for preventing relative rotation between said first and second component.

8. The apparatus as claimed in claim 7 wherein said engageable lock means comprises a ring concentric with and overlying both of said components, said ring having a plurality of spaced projections, each of said components having a plurality of recesses spaced around their circumference, and said plurality of projections extending into the plurality of the recesses on one of said components, and wherein said concentric ring being deformed into the plurality of recesses on the other of said components.

9. An apparatus comprising:
   a portion of a gas turbine engine including
   a first gas turbine engine component having a first cylindrical portion with an internal thread and a first annular abutment surface spaced from said internal thread, said first gas turbine engine component including a pair of first pilot surfaces spaced apart from said internal thread; and
   a second gas turbine engine component having a second annular portion with an external thread and a second annular abutment surface spaced from said external thread and abutting said first annular abutment surface, said first and second gas turbine engine components at least partially overlapping one another and said threads interengage to couple said components together and place the abutting abutment surfaces in a first sealing relationship, wherein one of said components is in tension and the other of said components is in compression between said abutting abutment surfaces and said interengaging threads, and further wherein said second gas turbine engine component including a pair of second pilot surfaces spaced apart from said external thread and in registry with said pair of first pilot surfaces to form a second sealing relationship.

10. The apparatus as claimed in claim 9 wherein the cylindrical components extending in an axial direction, and wherein the annular abutment surfaces are oriented substantially normal to the axial direction and the pilot surfaces are oriented substantially parallel with the axial direction.

11. The apparatus as claimed in claim 9 wherein the first and second pilot surfaces are disposed in an interference relationship.

12. The apparatus as claimed in claim 11 wherein one of said first pilot surfaces is adjacent said annular abutment surfaces and the other of said first pilot surfaces is remote from said one of said first pilot surfaces on the opposite end of said threads.

13. The apparatus as claimed in claim 9 which further includes a first lead-in piloting surface adjacent said first pilot surface and a second lead-in piloting surface adjacent said second pilot surface, wherein said lead-in surfaces are spaced apart and cooperate to facilitate alignment of said components before interengagement of said threads.

14. An apparatus comprising:
a gas turbine engine housing having a first portion with an internal thread and a first abutment surface spaced from said internal thread; and
a gas turbine engine component having a second portion with an external thread and a second abutment surface spaced from said external thread and abutting said first abutment surface, said housing and said components at least partially overlapping one another and said threads interengage to couple said components together and place the abutting abutment surfaces in a first sealing relationship, wherein one of said housing and said components is in tension and the other of said housing and said components is in compression between said abutting abutment surfaces and said interengaging threads.

15. The apparatus as claimed in claim 14 wherein said component is placed in compression against said first abutment surface.

16. The apparatus as claimed in claim 15, wherein said component is exposed to higher thermal loading during operation than said first component.

17. The apparatus as claimed in claim 16 wherein the higher thermal loading causes an increase in the axial preloading of said abutting surfaces during operation of the gas turbine engine.

18. The apparatus as claimed in claim 17 wherein the abutting abutment surfaces are oriented on a flow path side of said components.

* * * * *